US012801353B2

(12) United States Patent
Siddiqi et al.

(10) Patent No.: US 12,801,353 B2
(45) Date of Patent: Nov. 17, 2026

(54) HYDRATING AND RENDERING OF CONTROLS ON A LOW CODE APPLICATION

(71) Applicant: UiPath, Inc., New York, NY (US)

(72) Inventors: Suhail Ahmad Siddiqi, Bangalore (IN); Sunil Ajjampur Jagadeesh, Bangalore (IN)

(73) Assignee: UiPath, Inc., New York, NY (US)

( * ) Notice: Subject to any disclaimer, the term of this patent is extended or adjusted under 35 U.S.C. 154(b) by 543 days.

(21) Appl. No.: 18/524,100

(22) Filed: Nov. 30, 2023

(65) Prior Publication Data

US 2025/0181320 A1 Jun. 5, 2025

(51) Int. Cl.
*G06F 8/34* (2018.01)
*G06F 8/38* (2018.01)

(52) U.S. Cl.
CPC . *G06F 8/34* (2013.01); *G06F 8/38* (2013.01)

(58) Field of Classification Search
None
See application file for complete search history.

(56) References Cited

U.S. PATENT DOCUMENTS 5,524,200 A * 6/1996 Orton ........................ G06F 8/24 715/790
5,555,368 A * 9/1996 Orton ........................ G06F 8/24 718/100
5,737,559 A * 4/1998 Orton ........................ G06F 8/24 715/807
2011/0283227 A1* 11/2011 Moore .................. G06F 3/0481 715/803
2013/0027408 A1* 1/2013 Garg ................... G06F 16/9577 345/473
2020/0272324 A1* 8/2020 Chanda ................... G06F 9/451
2021/0405851 A1* 12/2021 Wu ..................... G06F 3/04815
2021/0405852 A1* 12/2021 Wu ..................... G06F 3/04812
2023/0385528 A1* 11/2023 Botbol ................ G06F 16/9577

* cited by examiner

*Primary Examiner* — Qing Chen
(74) *Attorney, Agent, or Firm* — LeonardPatel PC; Sheetal S. Patel; Michael A. Leonard, II

(57) ABSTRACT

A system and method for performing hydrating and rendering of controls on a low code application includes initiating a visibility watcher element. The system and method also includes continuously rendering a plurality of controls on the application when the visibility watcher element intersects with the viewport. The system and method further includes exiting from the visibility watcher element from the viewport when the visibility watcher element is no longer intersecting with the viewport.

20 Claims, 10 Drawing Sheets

HYDRATING AND RENDERING OF CONTROLS ON A LOW CODE APPLICATION

FIELD

The present invention generally relates to hydrating and rendering of controls on a low code application or webpage.

BACKGROUND

Originally, all controls on a webpage are rendered and hydrated up front. Although the existing method works well for pages with a low number of controls, as the number of controls increases, the Time to Interactive (TTI) grows exponentially, proving to be unscalable. For example, if a page has 1 k controls, these controls are hydrated and rendered upfront before the user can interact with the page.

In the current method of eager rendering and hydration, control hydration entails creating a control model containing the business logic of the control. Specifically, hydration involves creating the control model and resolving various properties of the control. Once all properties are resolved, only then does the control become usable and hydrated. With eager rendering, all controls lead to the creation of an extensive DOM, causing the browser to lag on webpages containing many controls. To maintain a snappy application, it's essential to minimize the DOM and mitigate longer page load time.

Accordingly, an improved and/or alternative approach may be beneficial.

SUMMARY

Certain embodiments of the present invention may provide alternatives or solutions to the problems and needs in the art that have not yet been fully identified, appreciated, or solved by current webpage control rendering technologies. For example, some embodiments of the present invention pertain to hydrating and rendering of controls on a webpage.

In an embodiment, a computer-implemented method for performing hydrating and rendering of controls on an application includes initiating, by at least one processor, a visibility watcher element. The method also includes continuously rendering, by the at least one processor, a plurality of controls on the application when the visibility watcher element intersects with a viewport. The method further includes exiting, by the at least one processor, from the visibility watcher element from the viewport when the visibility watcher element is no longer intersecting with the viewport.

In another embodiment, a system configured to perform hydrating and rendering of controls on an application include memory comprising a set of instructions and at least one processor. The set of instructions are configured to cause the at least one process to execute initiating, by at least one processor, a visibility watcher element. The set of instructions are further configured to cause the at least one process to execute continuously rendering, by the at least one processor, a plurality of controls on the application when the visibility watcher element intersects with a viewport. The set of instructions are further configured to cause the at least one process to execute exiting, by the at least one processor, from the visibility watcher element from the viewport when the visibility watcher element is no longer intersecting with the viewport.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Some embodiments pertain to lazy rendering and hydration of controls on a low code application (hereinafter "application"). For purposes of explanation, a webpage may be referred to as an application. However, it should be noted that an application may be any type of software application that may be displayed in a page format and includes controls (e.g., textboxes, images, etc.). More specifically, some embodiments include lazy rendering and hydration of a minimum set of controls that fit into a viewport. Viewport is the user's visible area of a web page. The viewport varies with the device, and will be smaller on a mobile phone than on a computer screen. To achieve this, a JavaScript™ application programming interface (API) Intersection Observer™ is used. Intersection Observer™ helps identify when an element on the webpage is visible on the screen. Further, an empty <div> in the panel control called Visibility Watcher™ is added, in some embodiments. Intersection Observer™ is attached to Visibility Watcher™ to determine when Visibility Watcher™ is visible (intersecting) on the viewport.

Generally, all controls on the webpage are rendered and hydrated up front. Although the current method works for webpages with a low number of controls, when the number of controls increase, the TTI grows exponentially, proving to be unscalable. For example, if a page has 1 k controls, these controls are hydrated and rendered upfront prior to the user interacting with the webpage. This leads to an increase in loading time of the webpage.

In traditional eager rendering and hydration, controls are hydrated and rendered irrespective of the viewport size. In some embodiments, a lazy rendering and hydration method is provided in which only those controls that fit into the viewport are hydrated and rendered. This will be described in more detail below with respect to FIG. 1.

Figure 1:
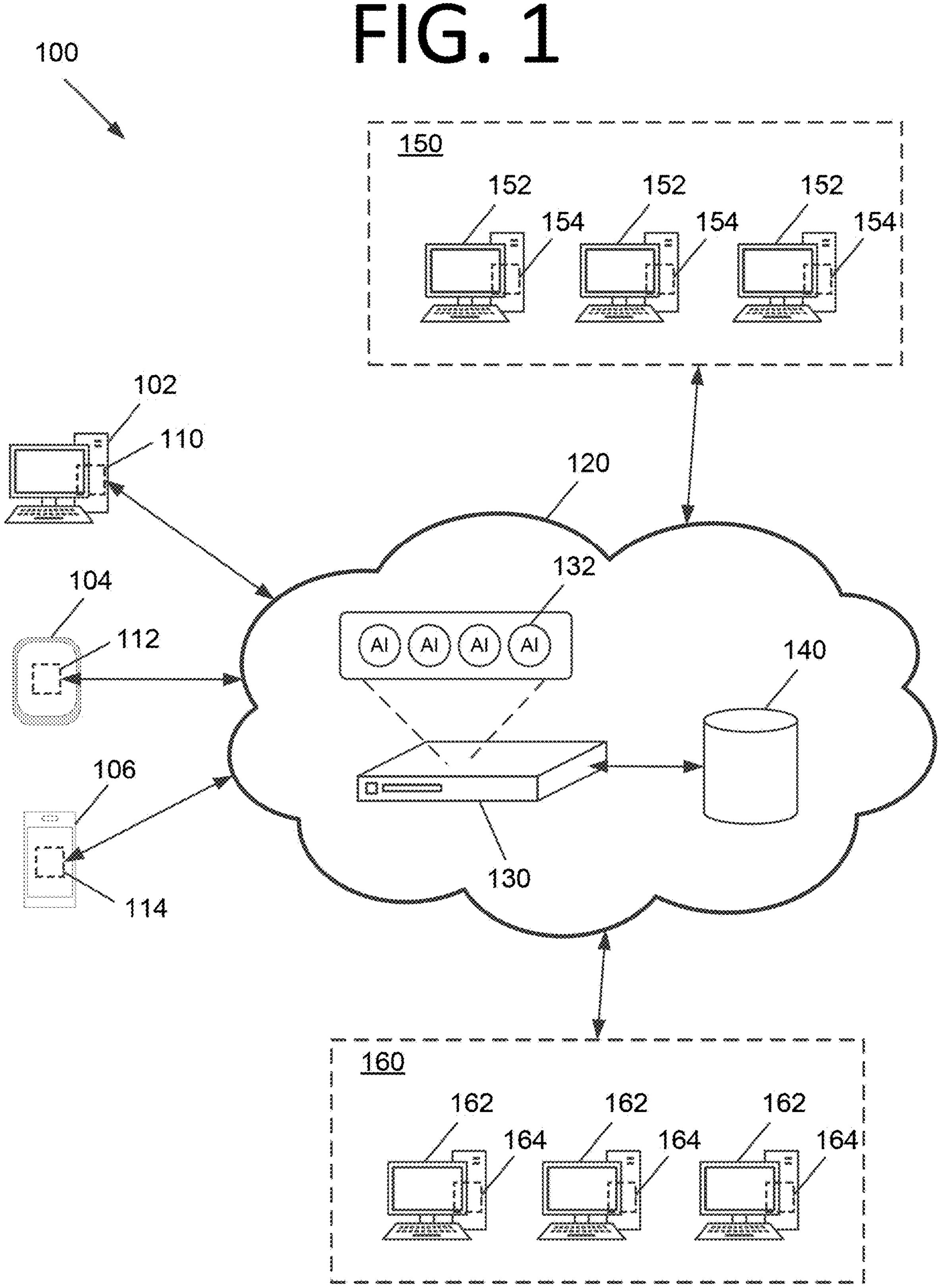
FIG. 1 is an architectural diagram illustrating a hyperautomation system, according to an embodiment of the present invention.

FIG. 1 is an architectural diagram illustrating a hyper-automation system 100, according to an embodiment of the present invention. "Hyper-automation," as used herein, refers to automation systems that bring together components of process automation, integration tools, and technologies that amplify the ability to automate work. For instance, RPA may be used at the core of a hyper-automation system in some embodiments, and in certain embodiments, automation capabilities may be expanded with artificial intelligence (AI)/machine learning (ML), process mining, analytics, and/or other advanced tools. As the hyper-automation system learns processes, trains AI/ML models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, and scale automations.

Hyper-automation system 100 includes user computing systems, such as desktop computer 102, tablet 104, and smart phone 106. However, any desired user computing system may be used without deviating from the scope of the invention including, but not limited to, smart watches, laptop computers, servers, Internet-of-Things (IoT) devices, etc. Also, while three user computing systems are shown in FIG. 1, any suitable number of user computing systems may be used without deviating from the scope of the invention. For instance, in some embodiments, dozens, hundreds, thousands, or millions of user computing systems may be used. The user computing systems may be actively used by a user or run automatically without much or any user input.

Each user computing system 102, 104, 106 has respective automation process(es) 110, 112, 114 running thereon. Automation process(es) 110, 112, 114 may include, but are not limited to, RPA robots, part of an operating system, downloadable application(s) for the respective computing system, any other suitable software and/or hardware, or any combination of these without deviating from the scope of the invention. In some embodiments, one or more of process(es) 110, 112, 114 may be listeners. Listeners may be RPA robots, part of an operating system, a downloadable application for the respective computing system, or any other software and/or hardware without deviating from the scope of the invention. Indeed, in some embodiments, the logic of the listener(s) is implemented partially or completely via physical hardware.

Listeners monitor and record data pertaining to user interactions with respective computing systems and/or operations of unattended computing systems and send the data to a core hyper-automation system 120 via a network (e.g., a local area network (LAN), a mobile communications network, a satellite communications network, the Internet, any combination thereof, etc.). The data may include, but is not limited to, which buttons were clicked, where a mouse was moved, the text that was entered in a field, that one window was minimized and another was opened, the application associated with a window, etc. In certain embodiments, the data from the listeners may be sent periodically as part of a heartbeat message. In some embodiments, the data may be sent to core hyper-automation system 120 once a predetermined amount of data has been collected, after a predetermined time period has elapsed, or both. One or more servers, such as server 130, receive and store data from the listeners in a database, such as database 140.

Automation processes may execute the logic developed in workflows during design time. In the case of RPA, workflows may include a set of steps, defined herein as "activities," that are executed in a sequence or some other logical flow. Each activity may include an action, such as clicking a button, reading a file, writing to a log panel, etc. In some embodiments, workflows may be nested or embedded.

Long-running workflows for RPA in some embodiments are master projects that support service orchestration, human intervention, and long-running transactions in unattended environments. See, for example, U.S. Pat. No. 10,860,905, which is hereby incorporated by reference in its entirety. Human intervention comes into play when certain processes require human inputs to handle exceptions, approvals, or validation before proceeding to the next step in the activity. In this situation, the process execution is suspended, freeing up the RPA robots until the human task completes.

A long-running workflow may support workflow fragmentation via persistence activities and may be combined with invoke process and non-user interaction activities, orchestrating human tasks with RPA robot tasks. In some embodiments, multiple or many computing systems may participate in executing the logic of a long-running workflow. The long-running workflow may run in a session to facilitate speedy execution. In some embodiments, long-running workflows may orchestrate background processes that may contain activities performing Application Programming Interface (API) calls and running in the long-running workflow session. These activities may be invoked by an invoke process activity in some embodiments. A process with user interaction activities that runs in a user session may be called by starting a job from a conductor activity (conductor described in more detail later herein). The user may interact through tasks that require forms to be completed in the conductor in some embodiments. Activities may be included that cause the RPA robot to wait for a form task to be completed and then resume the long-running workflow.

One or more of automation process(es) 110, 112, 114 is in communication with core hyper-automation system 120. In some embodiments, core hyper-automation system 120 may run a conductor application on one or more servers, such as server 130. While one server 130 is shown for illustration purposes, multiple or many servers that are proximate to one another or in a distributed architecture may be employed without deviating from the scope of the invention. For instance, one or more servers may be provided for conductor functionality, AI/ML model serving, authentication, governance, and or any other suitable functionality without deviating from the scope of the invention. In some embodiments, core hyper-automation system 120 may incorporate or be part of a public cloud architecture, a private cloud architecture, a hybrid cloud architecture, etc. In certain embodiments, core hyper-automation system 120 may host multiple software-based servers on one or more computing systems, such as server 130. In some embodiments, one or more servers of core hyper-automation system 120, such as server 130, may be implemented via one or more virtual machines (VMs).

In some embodiments, one or more of automation process (es) 110, 112, 114 may call one or more AI/ML models 132 deployed on or accessible by core hyper-automation system 120. AI/ML models 132 may be trained for any suitable purpose without deviating from the scope of the invention, as will be discussed in more detail later herein. Two or more of AI/ML models 132 may be chained in some embodiments (e.g., in series, in parallel, or a combination thereof) such that they collectively provide collaborative output(s). AI/ML models 132 may perform or assist with computer vision (CV), optical character recognition (OCR), document processing and/or understanding, semantic learning and/or analysis, analytical predictions, process discovery, task mining, testing, automatic RPA workflow generation, sequence extraction, clustering detection, audio-to-text translation, any combination thereof, etc. However, any desired number and/or type(s) of AI/ML models may be used without deviating from the scope of the invention. Using multiple AI/ML models may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models are deployed locally on at least one of computing systems 102, 104, 106.

In some embodiments, multiple AI/ML models 132 may be used. Each AI/ML model 132 is an algorithm (or model) that runs on the data, and the AI/ML model itself may be a deep learning neural network (DLNN) of trained artificial "neurons" that are trained on training data, for example. In some embodiments, AI/ML models 132 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to perform the desired functionality.

Hyper-automation system 100 may provide four main groups of functionality in some embodiments: (1) discovery; (2) building automations; (3) management; and (4) engagement. Automations (e.g., run on a user computing system, a server, etc.) may be run by software robots, such as RPA robots, in some embodiments. For instance, attended robots, unattended robots, and/or test robots may be used. Attended robots work with users to assist them with tasks (e.g., via UiPath Assistant™). Unattended robots work independently of users and may run in the background, potentially without user knowledge. Test robots are unattended robots that run test cases against applications or RPA workflows. Test robots may be run on multiple computing systems in parallel in some embodiments.

The discovery functionality may discover and provide automatic recommendations for different opportunities of automation of business processes. Such functionality may be implemented by one or more servers, such as server 130. The discovery functionality may include providing an automation hub, process mining, task mining, and/or task capture in some embodiments. The automation hub (e.g., UiPath Automation Hub™) may provide a mechanism for managing automation rollout with visibility and control. Automation ideas may be crowdsourced from employees via a submission form, for example. Feasibility and return on investment (ROI) calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relationship management (CRM) applications, email applications, call center applications, etc.) to identify what end-to-end processes exist in an organization and how to automate them effectively, as well as indicate what the impact of the automation will be. This data may be gleaned from user computing systems 102, 104, 106 by listeners, for example, and processed by servers, such as server 130. One or more AI/ML models 132 may be employed for this purpose in some embodiments. This information may be exported to the automation hub to speed up implementation and avoid manual information transfer. The goal of process mining may be to increase business value by automating processes within an organization. Some examples of process mining goals include, but are not limited to, increasing profit, improving customer satisfaction, regulatory and/or contractual compliance, improving employee efficiency, etc.

Task mining (e.g., via UiPath Automation Cloud™ and/or UiPath AI Center™) identifies and aggregates workflows (e.g., employee workflows), and then applies AI to expose patterns and variations in day-to-day tasks, scoring such tasks for ease of automation and potential savings (e.g., time and/or cost savings). One or more AI/ML models 132 may be employed to uncover recurring task patterns in the data. Repetitive tasks that are ripe for automation may then be identified. This information may initially be provided by listeners and analyzed on servers of core hyper-automation system 120, such as server 130, in some embodiments. The findings from task mining (e.g., Extensible Application Markup Language (XAML) process data) may be exported to process documents or to a designer application such as UiPath Studio™ to create and deploy automations more rapidly.

Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to a designer application in some embodiments, such as UiPath Studio™. Task capture may simplify the requirements gathering process for both subject matter experts explaining a process and Center of Excellence (CoE) members providing production-grade automations.

Building automations may be accomplished via a designer application (e.g., UiPath Studio™, UiPath StudioX™, or UiPath Web™). For instance, RPA developers of an RPA development facility 150 may use RPA designer applications 154 of computing systems 152 to build and test automations for various applications and environments, such as web, mobile, SAP®, and virtualized desktops. API integration may be provided for various applications, technologies, and platforms. Predefined activities, drag-and-drop modeling, and a workflow recorder, may make automation easier with minimal coding. Document understanding functionality may be provided via Drag-and-drop AI skills for data extraction and interpretation that call one or more AI/ML models 132. Such automations may process virtually any document type and format, including tables, checkboxes, signatures, and handwriting. When data is validated or exceptions are handled, this information may be used to retrain the respective AI/ML models, improving their accuracy over time.

An integration service may allow developers to seamlessly combine user interface (UI) automation with API automation, for example. Automations may be built that require APIs or traverse both API and non-API applications and systems. A repository (e.g., UiPath Object Repository™) or marketplace (e.g., UiPath Marketplace™) for pre-built RPA and AI templates and solutions may be provided to allow developers to automate a wide variety of processes more quickly. Thus, when building automations, hyper-automation system 100 may provide user interfaces, development environments, API integration, pre-built and/or custom-built AI/ML models, development templates, integrated development environments (IDEs), and advanced AI capabilities. Hyper-automation system 100 enables development, deployment, management, configuration, monitoring, debugging, and maintenance of RPA robots in some embodiments, which may provide automations for hyper-automation system 100.

In some embodiments, components of hyper-automation system 100, such as designer application(s) and/or an external rules engine, provide support for managing and enforcing governance policies for controlling various functionality provided by hyper-automation system 100. Governance is the ability for organizations to put policies in place to prevent users from developing automations (e.g., RPA robots) capable of taking actions that may harm the organization, such as violating the E.U. General Data Protection Regulation (GDPR), the U.S. Health Insurance Portability and Accountability Act (HIPAA), third-party application terms of service, etc. Since developers may otherwise create automations that violate privacy laws, terms of service, etc. while performing their automations, some embodiments implement access control and governance restrictions at the robot and/or robot design application level. This may provide an added level of security and compliance into to the automation process development pipeline in some embodiments by preventing developers from taking dependencies on unapproved software libraries that may either introduce security risks or work in a way that violates policies, regulations, privacy laws, and/or privacy policies. See, for example, U.S. Patent Application Publication No. 2022/0011732, which is hereby incorporated by reference in its entirety.

The management functionality may provide management, deployment, and optimization of automations across an organization. The management functionality may include orchestration, test management, AI functionality, and/or insights in some embodiments. Management functionality of hyper-automation system 100 may also act as an integration point with third-party solutions and applications for automation applications and/or RPA robots. The management capabilities of hyper-automation system 100 may include, but are not limited to, facilitating provisioning, deployment, configuration, queuing, monitoring, logging, and interconnectivity of RPA robots, among other things.

A conductor application, such as UiPath Orchestrator™ (which may be provided as part of the UiPath Automation Cloud™ in some embodiments, or on premises, in VMs, in a private or public cloud, in a Linux™ VM, or as a cloud native single container suite via UiPath Automation Suite™), provides orchestration capabilities to deploy, monitor, optimize, scale, and ensure security of RPA robot deployments. A test suite (e.g., UiPath Test Suite™) may provide test management to monitor the quality of deployed automations. The test suite may facilitate test planning and execution, meeting of requirements, and defect traceability. The test suite may include comprehensive test reporting.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by human users.

A data service (e.g., UiPath Data Service™) may be stored in database 140, for example, and bring data into a single, scalable, secure place with a drag-and-drop storage interface. Some embodiments may provide low-code or no-code data modeling and storage to automations while ensuring seamless access, enterprise-grade security, and scalability of the data. AI functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots) may call AI/ML models from the AI center, such as AI/ML models 132. Performance of the AI/ML models may be monitored, and be trained and improved using human-validated data, such as that provided by data review center 160. Human reviewers may provide labeled data to core hyper-automation system 120 via a review application 152 on computing systems 154. For instance, human reviewers may validate that predictions by AI/ML models 132 are accurate or provide corrections otherwise. This dynamic input may then be saved as training data for retraining AI/ML models 132, and may be stored in a database such as database 140, for example. The AI center may then schedule and execute training jobs to train the new versions of the AI/ML models using the training data. Both positive and negative examples may be stored and used for retraining of AI/ML models 132.

The engagement functionality engages humans and automations as one team for seamless collaboration on desired processes. Low-code applications may be built (e.g., via UiPath Apps™) to connect browser tabs and legacy software, even that lacking APIs in some embodiments. Applications may be created quickly using a web browser through a rich library of drag-and-drop controls, for instance. An application can be connected to a single automation or multiple automations.

An action center (e.g., UiPath Action Center™) provides a straightforward and efficient mechanism to hand off processes from automations to humans, and vice versa. Humans may provide approvals or escalations, make exceptions, etc. The automation may then perform the automatic functionality of a given workflow.

A local assistant may be provided as a launchpad for users to launch automations (e.g., UiPath Assistant™). This functionality may be provided in a tray provided by an operating system, for example, and may allow users to interact with RPA robots and RPA robot-powered applications on their computing systems. An interface may list automations approved for a given user and allow the user to run them. These may include ready-to-go automation from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

Chatbots (e.g., UiPath Chatbots™), social messaging applications, and/or voice commands may enable users to run automations. This may simplify access to information, tools, and resources users need in order to interact with customers or perform other activities. Conversations between people may be readily automated, as with other processes. Trigger RPA robots kicked off in this manner may perform operations such as checking an order status, posting data in a CRM, etc., potentially using plain language commands.

End-to-end measurement and government of an automation program at any scale may be provided by hyper-automation system 100 in some embodiments. Per the above, analytics may be employed to understand the performance of automations (e.g., via UiPath Insights™). Data modeling and analytics using any combination of available business metrics and operational insights may be used for various automated processes. Custom-designed and pre-built dashboards allow data to be visualized across desired metrics, new analytical insights to be discovered, performance indicators to be tracked, ROI to be discovered for automations, telemetry monitoring to be performed on user computing systems, errors and anomalies to be detected, and automations to be debugged. An automation management console (e.g., UiPath Automation Ops™) may be provided to manage automations throughout the automation lifecycle. An organization may govern how automations are built, what users can do with them, and which automations users can access.

Hyper-automation system 100 provides an iterative platform in some embodiments. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automation.

Figure 2:
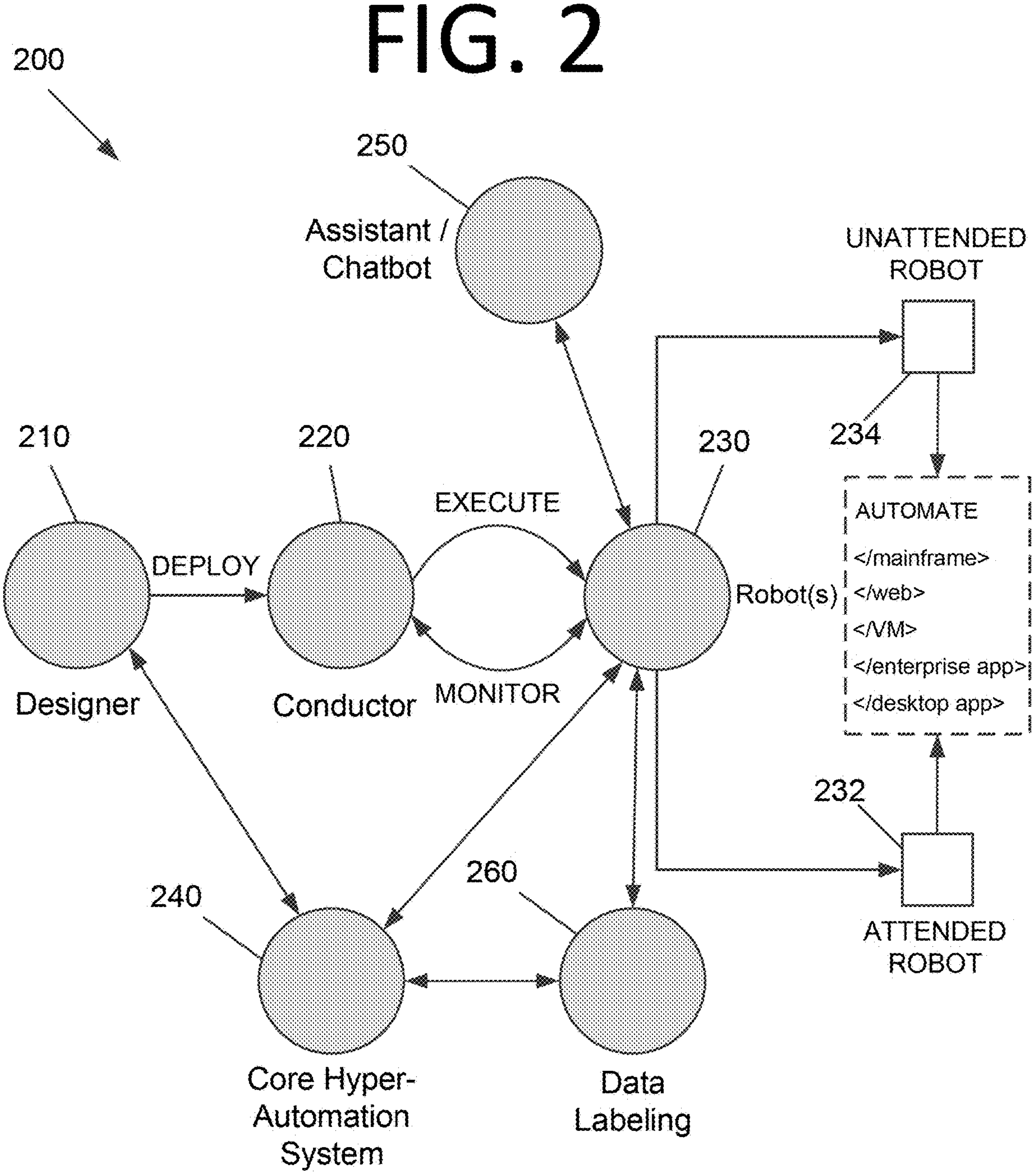
FIG. 2 is an architectural diagram illustrating an RPA system, according to an embodiment of the present invention.

FIG. 2 is an architectural diagram illustrating an RPA system 200, according to an embodiment of the present invention. In some embodiments, RPA system 200 is part of hyper-automation system 100 of FIG. 1. RPA system 200 includes a designer 210 that allows a developer to design and implement workflows. Designer 210 may provide a solution for application integration, as well as automating third-party applications, administrative Information Technology (IT) tasks, and business IT processes. Designer 210 may facilitate development of an automation project, which is a graphical representation of a business process. Simply put, designer 210 facilitates the development and deployment of workflows and robots. In some embodiments, designer 210 may be an application that runs on a user's desktop, an application that runs remotely in a VM, a web application, etc.

The automation project enables automation of rule-based processes by giving the developer control of the execution order and the relationship between a custom set of steps developed in a workflow, defined herein as "activities" per the above. One commercial example of an embodiment of designer 210 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable for more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 210, execution of business processes is orchestrated by conductor 220, which orchestrates one or more robots 230 that execute the workflows developed in designer 210. One commercial example of an embodiment of conductor 220 is UiPath Orchestrator™. Conductor 220 facilitates management of the creation, monitoring, and deployment of resources in an environment. Conductor 220 may act as an integration point with third-party solutions and applications. Per the above, in some embodiments, conductor 220 may be part of core hyper-automation system 120 of FIG. 1.

Conductor 220 may manage a fleet of robots 230, connecting and executing robots 230 from a centralized point. Types of robots 230 that may be managed include, but are not limited to, attended robots 232, unattended robots 234, development robots (similar to unattended robots 234, but used for development and testing purposes), and nonproduction robots (similar to attended robots 232, but used for development and testing purposes). Attended robots 232 are triggered by user events and operate alongside a human on the same computing system. Attended robots 232 may be used with conductor 220 for a centralized process deployment and logging medium. Attended robots 232 may help the human user accomplish various tasks, and may be triggered by user events. In some embodiments, processes cannot be started from conductor 220 on this type of robot and/or they cannot run under a locked screen. In certain embodiments, attended robots 232 can only be started from a robot tray or from a command prompt. Attended robots 232 should run under human supervision in some embodiments.

Unattended robots 234 run unattended in virtual environments and can automate many processes. Unattended robots 234 may be responsible for remote execution, monitoring, scheduling, and providing support for work queues. Debugging for all robot types may be run in designer 210 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 220 may have various capabilities including, but not limited to, provisioning, deployment, configuration, queueing, monitoring, logging, and/or providing interconnectivity. Provisioning may include creating and maintenance of connections between robots 230 and conductor 220 (e.g., a web application). Deployment may include assuring the correct delivery of package versions to assigned robots 230 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., a structured query language (SQL) database or a "not only" SQL (NoSQL) database) and/or another storage mechanism (e.g., ElasticSearch®, which provides the ability to store and quickly query large datasets). Conductor 220 may provide interconnectivity by acting as the centralized point of communication for third-party solutions and/or applications.

Robots 230 are execution agents that implement workflows built in designer 210. One commercial example of some embodiments of robot(s) 230 is UiPath Robots™. In some embodiments, robots 230 install the Microsoft Windows® Service Control Manager (SCM)-managed service by default. As a result, such robots 230 can open interactive Windows® sessions under the local system account, and have the rights of a Windows® service.

In some embodiments, robots 230 can be installed in a user mode. For such robots 230, this means they have the same rights as the user under which a given robot 230 has been installed. This feature may also be available for High Density (HD) robots, which ensure full utilization of each machine at its maximum potential. In some embodiments, any type of robot 230 may be configured in an HD environment.

Robots 230 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 220 and the execution hosts (i.e., the computing systems on which robots 230 are executed). These services are trusted with and manage the credentials for robots 230. A console application is launched by the SCM under the local system.

User mode robot services in some embodiments manage and monitor Windows® sessions and act as a proxy between conductor 220 and the execution hosts. User mode robot services may be trusted with and manage the credentials for robots 230. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 230 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 210 may also be independent of browser zoom level in some embodiments. For applications that are DPI-unaware or intentionally marked as unaware, DPI may be disabled in some embodiments.

RPA system 200 in this embodiment is part of a hyper-automation system. Developers may use designer 210 to build and test RPA robots that utilize AI/ML models deployed in core hyper-automation system 240 (e.g., as part of an AI center thereof). Such RPA robots may send input for execution of the AI/ML model(s) and receive output therefrom via core hyper-automation system 240.

One or more of robots 230 may be listeners, as described above. These listeners may provide information to core hyper-automation system 240 regarding what users are doing when they use their computing systems. This information may then be used by core hyper-automation system for process mining, task mining, task capture, etc.

An assistant/chatbot 250 may be provided on user computing systems to allow users to launch RPA local robots. The assistant may be located in a system tray, for example. Chatbots may have a user interface so users can see text in the chatbot. Alternatively, chatbots may lack a user interface and run in the background, listening using the computing system's microphone for user speech.

In some embodiments, data labeling may be performed by a user of the computing system on which a robot is executing or on another computing system that the robot provides information to. For instance, if a robot calls an AI/ML model that performs CV on images for VM users, but the AI/ML model does not correctly identify a button on the screen, the user may draw a rectangle around the misidentified or non-identified component and potentially provide text with a correct identification. This information may be provided to core hyper-automation system 240 and then used later for training a new version of the AI/ML model.

Figure 3:
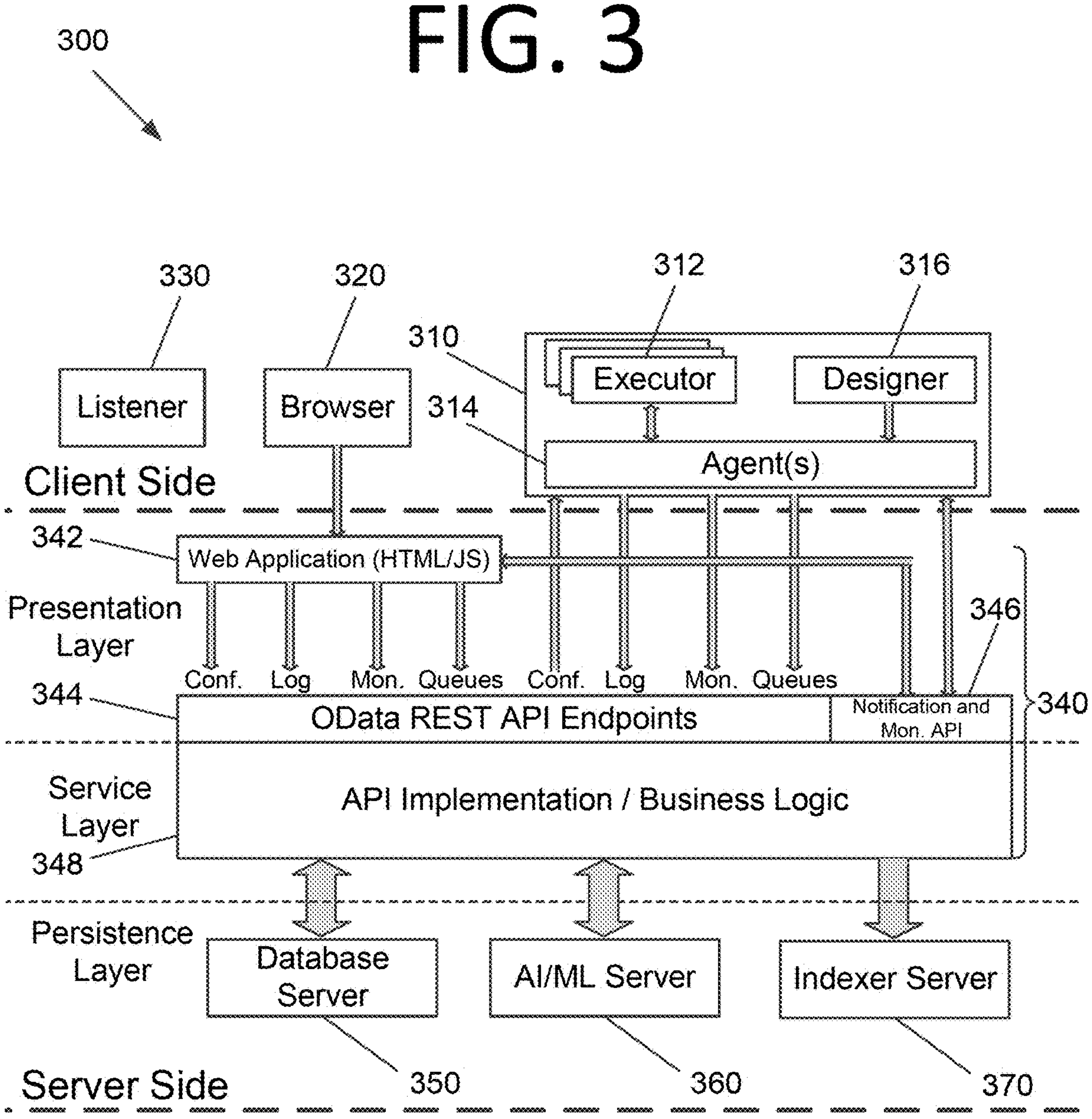
FIG. 3 is an architectural diagram illustrating a deployed RPA system, according to an embodiment of the present invention.

FIG. 3 is an architectural diagram illustrating a deployed RPA system 300, according to an embodiment of the present invention. In some embodiments, RPA system 300 may be a part of RPA system 200 of FIG. 2 and/or hyper-automation system 100 of FIG. 1. Deployed RPA system 300 may be a cloud-based system, an on-premises system, a desktop-based system that offers enterprise level, user level, or device level automation solutions for automation of different computing processes, etc.

It should be noted that the client side, the server side, or both, may include any desired number of computing systems without deviating from the scope of the invention. On the client side, a robot application 310 includes executors 312, an agent 314, and a designer 316. However, in some embodiments, designer 316 may not be running on the same computing system as executors 312 and agent 314. Executors 312 are running processes. Several business projects may run simultaneously, as shown in FIG. 3. Agent 314 (e.g., a Windows® service) is the single point of contact for all executors 312 in this embodiment. All messages in this embodiment are logged into conductor 340, which processes them further via database server 350, an AI/ML server 360, an indexer server 370, or any combination thereof. As discussed above with respect to FIG. 2, executors 312 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 314 is also responsible for sending the status of the robot (e.g., periodically sending a "heartbeat" message indicating that the robot is still functioning) and downloading the required version of the package to be executed. The communication between agent 314 and conductor 340 is always initiated by agent 314 in some embodiments. In the notification scenario, agent 314 may open a WebSocket channel that is later used by conductor 340 to send commands to the robot (e.g., start, stop, etc.).

A listener 330 monitors and records data pertaining to user interactions with an attended computing system and/or operations of an unattended computing system on which listener 330 resides. Listener 330 may be an RPA robot, part of an operating system, a downloadable application for the respective computing system, or any other software and/or hardware without deviating from the scope of the invention. Indeed, in some embodiments, the logic of the listener is implemented partially or completely via physical hardware.

On the server side, a presentation layer (web application 342, Open Data Protocol (OData) Representative State Transfer (REST) Application Programming Interface (API) endpoints 344, and notification and monitoring 346), a service layer (API implementation/business logic 348), and a persistence layer (database server 350, AI/ML server 360, and indexer server 370) are included. Conductor 340 includes web application 342, OData REST API endpoints 344, notification and monitoring 346, and API implementation/business logic 348. In some embodiments, most actions that a user performs in the interface of conductor 340 (e.g., via browser 320) are performed by calling various APIs. Such actions may include, but are not limited to, starting jobs on robots, adding/removing data in queues, scheduling jobs to run unattended, etc. without deviating from the scope of the invention. Web application 342 is the visual layer of the server platform. In this embodiment, web application 342 uses Hypertext Markup Language (HTML) and JavaScript (JS). However, any desired markup languages, script languages, or any other formats may be used without deviating from the scope of the invention. The user interacts with web pages from web application 342 via browser 320 in this embodiment in order to perform various actions to control conductor 340. For instance, the user may create robot groups, assign packages to the robots, analyze logs per robot and/or per process, start and stop robots, etc.

In addition to web application 342, conductor 340 also includes a service layer that exposes OData REST API endpoints 344. However, other endpoints may be included without deviating from the scope of the invention. The REST API is consumed by both web application 342 and agent 314. Agent 314 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 340. Queueing REST endpoints may be responsible for queues and queue item management, such as adding data to a queue, obtaining a transaction from the queue, setting the status of a transaction, etc.

Monitoring REST endpoints may monitor web application 342 and agent 314. Notification and monitoring API 346 may be REST endpoints that are used for registering agent 314, delivering configuration settings to agent 314, and for sending/receiving notifications from the server and agent 314. Notification and monitoring API 346 may also use WebSocket communication in some embodiments.

The APIs in the service layer may be accessed through configuration of an appropriate API access path in some embodiments, e.g., based on whether conductor 340 and an overall hyper-automation system have an on-premises deployment type or a cloud-based deployment type. APIs for conductor 340 may provide custom methods for querying stats about various entities registered in conductor 340. Each logical resource may be an OData entity in some embodiments. In such an entity, components such as the robot, process, queue, etc., may have properties, relationships, and operations. APIs of conductor 340 may be consumed by web application 342 and/or agents 314 in two ways in some embodiments: by getting the API access information from conductor 340, or by registering an external application to use the OAuth flow.

The persistence layer includes a trio of servers in this embodiment—database server 350 (e.g., a SQL server), AI/ML server 360 (e.g., a server providing AI/ML model serving services, such as AI center functionality) and indexer server 370. Database server 350 in this embodiment stores the configurations of the robots, robot groups, associated processes, users, roles, schedules, etc. This information is managed through web application 342 in some embodiments. Database server 350 may manage queues and queue items. In some embodiments, database server 350 may store messages logged by the robots (in addition to or in lieu of indexer server 370). Database server 350 may also store process mining, task mining, and/or task capture-related data, received from listener 330 installed on the client side, for example. While no arrow is shown between listener 330 and database 350, it should be understood that listener 330 is able to communicate with database 350, and vice versa in some embodiments. This data may be stored in the form of PDDs, images, XAML files, etc. Listener 330 may be configured to intercept user actions, processes, tasks, and performance metrics on the respective computing system on which listener 330 resides. For example, listener 330 may record user actions (e.g., clicks, typed characters, locations, applications, active elements, times, etc.) on its respective computing system and then convert these into a suitable format to be provided to and stored in database server 350.

AI/ML server 360 facilitates incorporation of AI/ML models into automations. Pre-built AI/ML models, model templates, and various deployment options may make such functionality accessible even to those who are not data scientists. Deployed automations (e.g., RPA robots) may call AI/ML models from AI/ML server 360. Performance of the AI/ML models may be monitored, and be trained and improved using human-validated data. AI/ML server 360 may schedule and execute training jobs to train new versions of the AI/ML models.

AI/ML server 360 may store data pertaining to AI/ML models and ML packages for configuring various ML skills for a user at development time. An ML skill, as used herein, is a pre-built and trained ML model for a process, which may be used by an automation, for example. AI/ML server 360 may also store data pertaining to document understanding technologies and frameworks, algorithms and software packages for various AI/ML capabilities including, but not limited to, intent analysis, natural language processing (NLP), speech analysis, different types of AI/ML models, etc.

Indexer server 370, which is optional in some embodiments, stores and indexes the information logged by the robots. In certain embodiments, indexer server 370 may be disabled through configuration settings. In some embodiments, indexer server 370 uses ElasticSearch®, which is an open source project full-text search engine. Messages logged by robots (e.g., using activities like log message or write line) may be sent through the logging REST endpoint (s) to indexer server 370, where they are indexed for future utilization.

Figure 4:
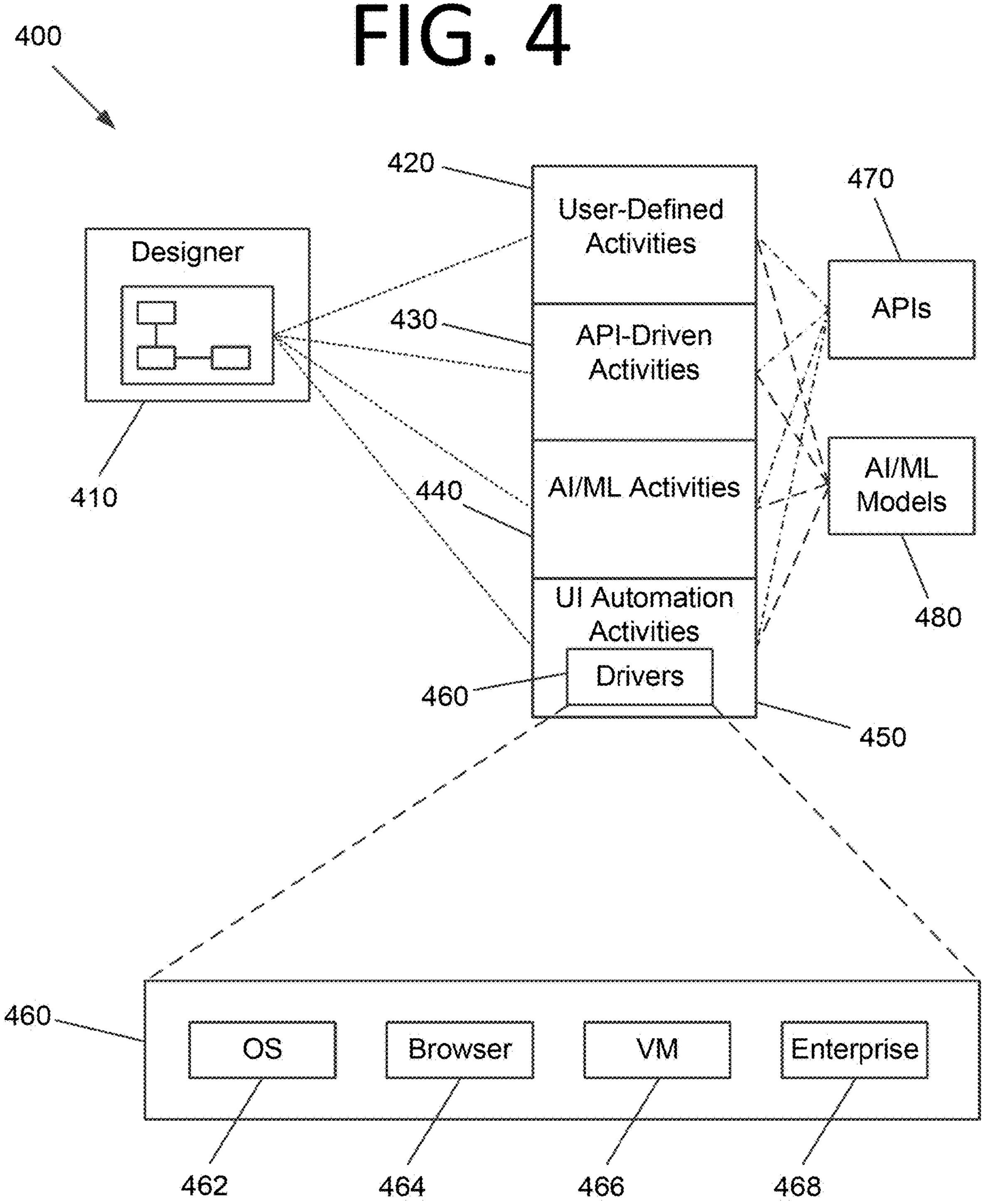
FIG. 4 is an architectural diagram illustrating the relationship between a designer, activities, and drivers, according to an embodiment of the present invention.

FIG. 4 is an architectural diagram illustrating the relationship 400 between a designer 410, activities 420, 430, 440, 450, drivers 460, APIs 470, and AI/ML models 480, according to an embodiment of the present invention. Per the above, a developer uses designer 410 to develop workflows that are executed by robots. The various types of activities may be displayed to the developer in some embodiments. Designer 410 may be local to the user's computing system or remote thereto (e.g., accessed via VM or a local web browser interacting with a remote web server). Workflows may include user-defined activities 420, API-driven activities 430, AI/ML activities 440, and/or UI automation activities 450. User-defined activities 420 and API-driven activities 440 interact with applications via their APIs. User-defined activities 420 and/or AI/ML activities 440 may call one or more AI/ML models 480 in some embodiments, which may be located locally to the computing system on which the robot is operating and/or remotely thereto.

Some embodiments are able to identify non-textual visual components in an image, which is called CV herein. CV may be performed at least in part by AI/ML model(s) 480. Some CV activities pertaining to such components may include, but are not limited to, extracting of text from segmented label data using OCR, fuzzy text matching, cropping of segmented label data using ML, comparison of extracted text in label data with ground truth data, etc. In some embodiments, there may be hundreds or even thousands of activities that may be implemented in user-defined activities 420. However, any number and/or type of activities may be used without deviating from the scope of the invention.

UI automation activities 450 are a subset of special, lower-level activities that are written in lower-level code and facilitate interactions with the screen. UI automation activities 450 facilitate these interactions via drivers 460 that allow the robot to interact with the desired software. For instance, drivers 460 may include operating system (OS) drivers 462, browser drivers 464, VM drivers 466, enterprise application drivers 468, etc. One or more of AI/ML models 480 may be used by UI automation activities 450 in order to perform interactions with the computing system in some embodiments. In certain embodiments, AI/ML models 480 may augment drivers 460 or replace them completely. Indeed, in certain embodiments, drivers 460 are not included.

Drivers 460 may interact with the OS at a low level looking for hooks, monitoring for keys, etc. via OS drivers 462. Drivers 460 may facilitate integration with Chrome®, IE®, Citrix®, SAP®, etc. For instance, the "click" activity performs the same role in these different applications via drivers 460.

Figure 5:
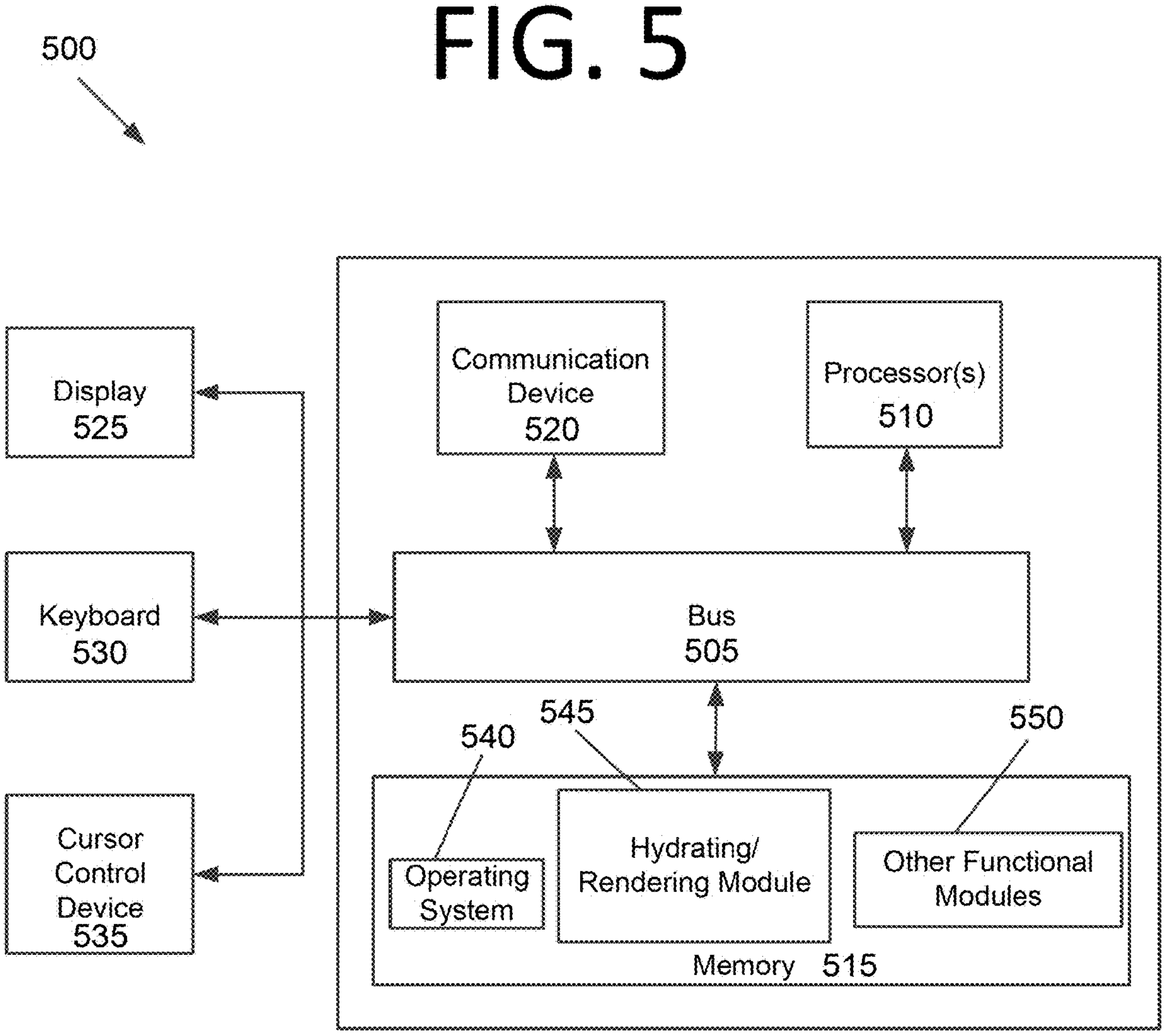
FIG. 5 is an architectural diagram illustrating a computing system configured to hydrate and render controls on a webpage, according to an embodiment of the present invention.

FIG. 5 is an architectural diagram illustrating a computing system 500 configured to perform lazy rendering and hydration of controls, according to an embodiment of the present invention. In some embodiments, computing system 500 may be one or more of the computing systems depicted and/or described herein. In certain embodiments, computing system 500 may be part of a hyper-automation system, such as that shown in FIGS. 1 and 2. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor (s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both. Computing system 500 includes a communication device 520, such as a transceiver, to provide access to a communications network via a wireless and/or wired connection. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a hydrating/rendering module 545 that is configured to perform all or part of the processes described herein or derivatives thereof. In some embodiments, hydrating/rendering module 545 is a JavaScript™ module embedded within a web browser. Computing system 500 may include one or more additional functional modules 550 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
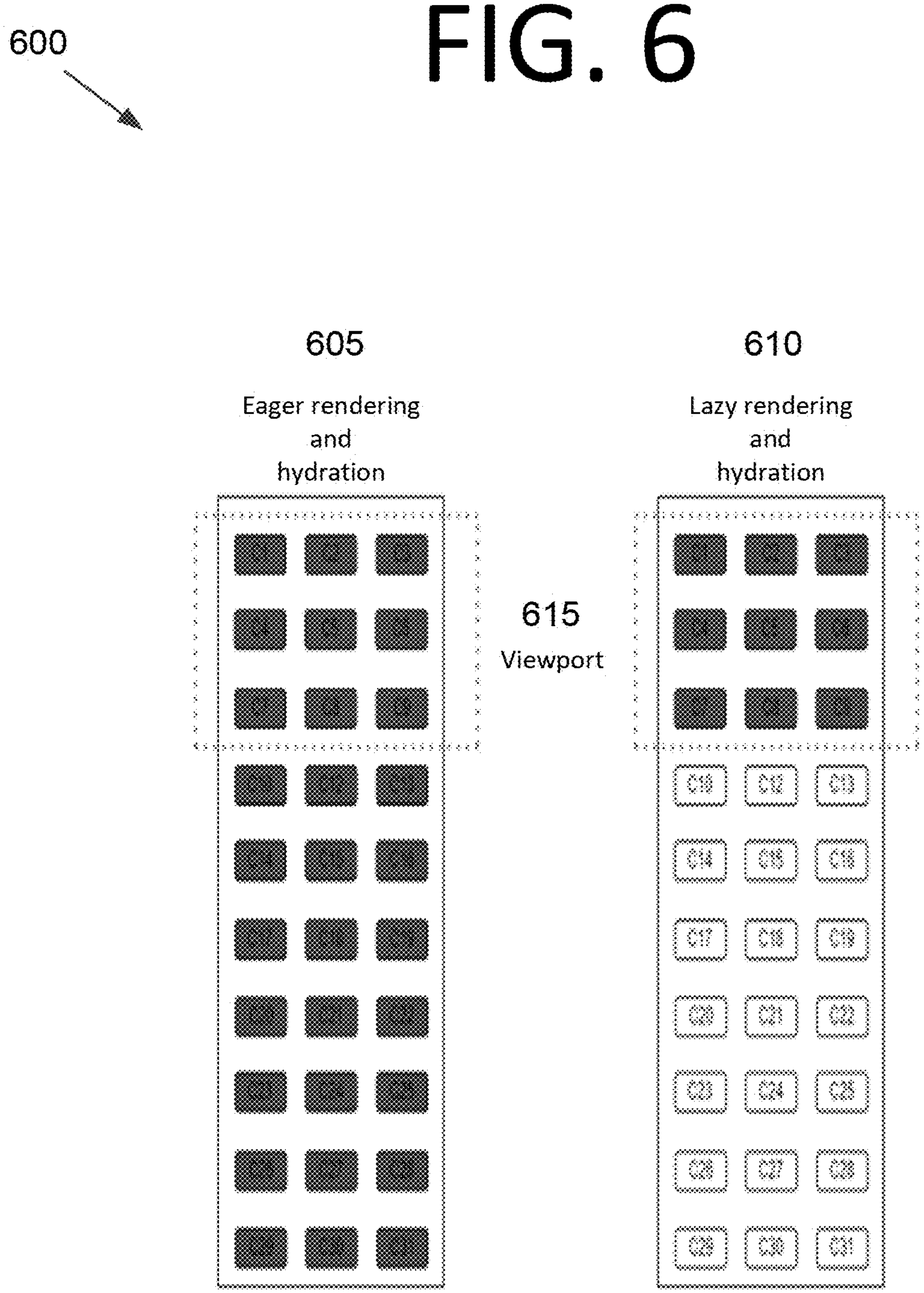
FIG. 6 is a diagram illustrating a panel (eager rendering/hydration) and panel (lazy rendering/hydration), according to an embodiment of the present invention.

FIG. 6 is a diagram illustrating a panel 605 (eager rendering/hydration) and panel 610 (lazy rendering/hydration), according to an embodiment of the present invention.

Conventionally, panel 605 shows eagerly rendering and hydrating an application (e.g., webpage). More specifically, panel 605 shows rendering and hydrating controls not only within viewport 615, but also controls outside of viewport 615. For example, in panel 605, controls C1 to C31 are all rendered and hydrated.

Viewport 605 is defined as a visible area for a user on an application. It should be noted that the size of viewport 605 may depend on the computing system being used. For example, for a larger device, the viewport may be larger, and for a smaller device, the viewport may be smaller.

Hydration is typically a costly operation/process. For example, controls generally have at least 30 or 40 properties. Hydrating a control, in this example, refers to the creation of the control model and initializing all the 30 to 40 properties. It should be noted, however, that the number of properties may depend on the application type.

After all the controls are hydrated, rendering begins, i.e., actually creating the document object model (DOM) element in the browser. To hydrate and render all controls that are outside of viewport 605 requires unnecessary computing or processing time, resulting in delaying the loading of the application (or webpage loading).

In some embodiments, however, controls that require to be rendered are determined, and only those controls are hydrated and rendered while the remaining controls are not hydrated or rendered. For instance, to resolve this problem, some embodiments generally pertain to hydrating and rendering only those controls that can be fit inside of viewport 605. See panel 610. The remaining controls in panel 610 remain as empty blocks, i.e., they are not hydrated or rendered until they are within viewport 610.

This way, N number of controls can be presented in a given application without influencing the load time of the application.

Let's say, in one example, when an uniform resource locator (URL) is launched, every URL has an application identifier. Now every application has a unique structure, where the user has defined. This unique structure (e.g., the models) is fetched from the server where the structure of the page is stored in JavaScript Object Notation (JSON) format. Once this is complete, the number of controls that will be displayed in the application is now known. In other words, the order in which the controls are to be rendered is known by fetching the structure of the page.

In some embodiments, to execute lazy rendering and hydration, a JavaScript™ API Intersection Observer™ determines if a DOM element on the webpage is visible on the screen. An empty <div> in the panel control called Visibility Watcher™ is added and an Intersection Observer™ is attached to the Visibility Watcher™ element, indicating whether the Visibility Watcher™ is visible (i.e., intersecting) on the viewport. For purposes of explanation, Visibility Watcher™ is a DOM element. Visibility Watcher™ and a corresponding Intersection Observer™ are present in each panel control. Depending on the orientation of the panel control, Visibility Watcher™ acquires different widths and heights. This is deliberately performed so that even if a single pixel of Visibility Watcher™ intersects with the viewport, the single pixel is considered to be visible on the screen. For example, as soon as the first pixel of the Visibility Watcher™ intersects with the viewport, the hydration and rendering process resumes. If there is no intersection between the first pixel of the Visibility Watcher™ and the viewport, the hydration and rendering process remains in a suspended state.

It should be appreciated that, in some embodiments, the controls do not have to be hydrated until the controls are ready to be rendered. Also, in some embodiments, since the controls may be previously hydrated, the controls do not have to be rehydrated, and only have to be rendered, when the control is within viewport 615.

Figure 7:
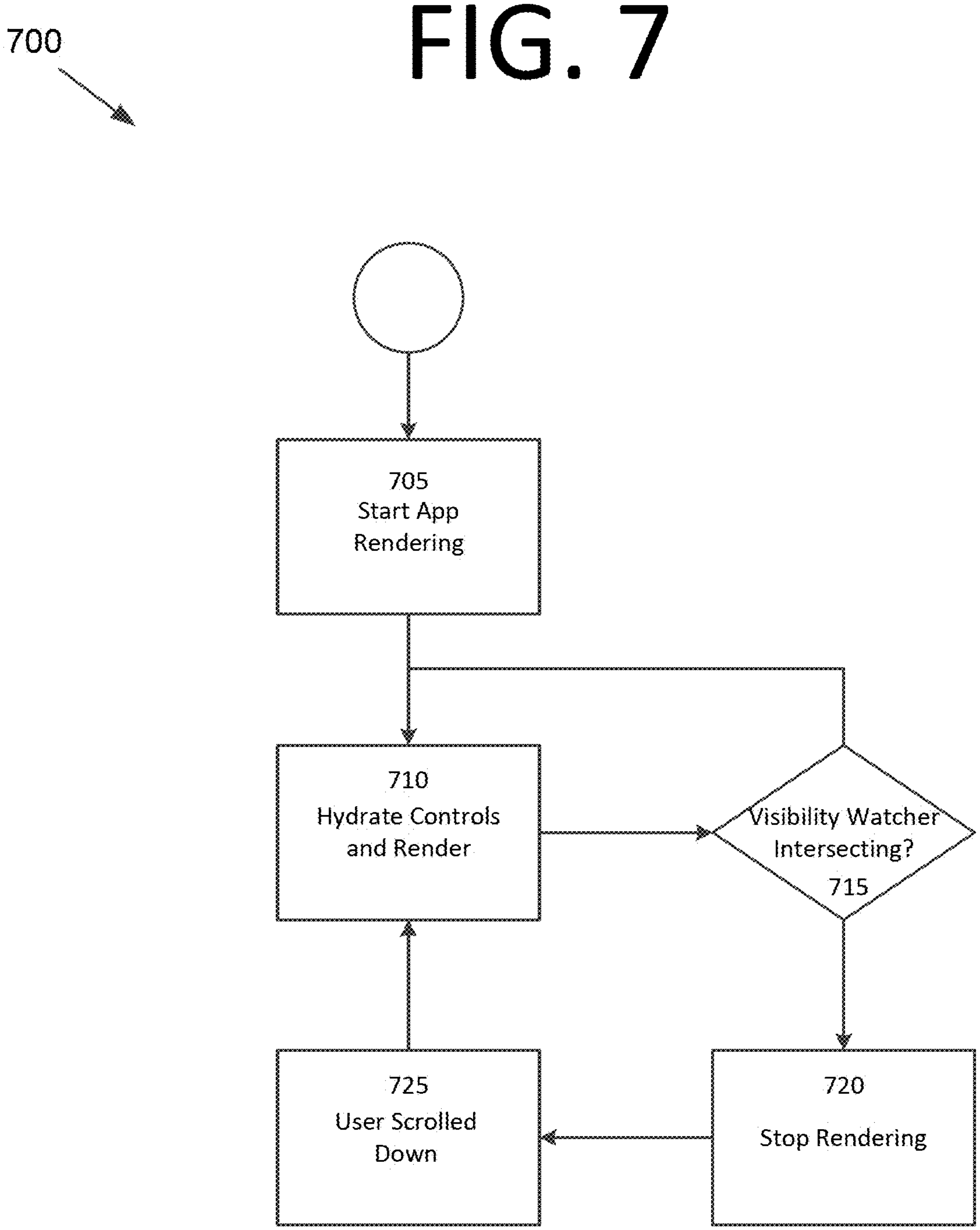
FIG. 7 is a flow diagram illustrating a method for rendering controls displayed in an application, according to an embodiment of the present invention.

FIG. 7 is a flow diagram illustrating a method 700 for rendering controls displayed in an application, according to an embodiment of the present invention. In some embodiments, method 700 begins at 705 with performing application rendering at the root panel, where it starts Intersection Observer™. Root panel may be defined as main container DOM element of the application (or top of the webpage). The root panel may, in one example, include a plurality of controls, some of which may be simpler controls (parent controls) and some of which may be nested controls. Nested controls are controls that contain other controls (child controls). Since the root panel does not have controls rendered yet, the Visibility Watcher™ of the root panel will intersect with the viewport.

At 710, since Visibility Watcher™ intersects with the viewport, the root panel hydrates and renders five (5) controls during the first batch, in this embodiment, even though there may be more than five (5) controls within Visibility Watcher™. Batch may be defined as the number of controls being hydrated and rendered in a panel simultaneously. In this embodiment, panel renders 5 controls in a batch, since this may be the optimum number of controls. It should be noted that the batch size should not be too high (creates sluggishness) or too low (lose benefit of lazy hydration and rendering). However, the number of controls being rendered in a batch (i.e., rendered simultaneously) depends on the framework of the application. The number of controls being rendered in the batch may also depend on the hydration mechanism.

The batch size needs to be fine-tuned depending on the hydration and rendering process of the application. Also, the kind of hardware configuration the application is intended to be supported on. Performance benchmarking should be done by varying batch size and monitor the load time of the webpage and also observe the smoothness of the application while scrolling through the webpage. The page should contain large number of controls, so the measurement can be done in a load test kind of environment.

A low configuration user machine will cause delays in hydration and rendering process, so a high batch size should be avoided as it will lead to sluggish user experience. While on a high configuration machine, the batch size can be comparatively higher as the hydration and rendering process will be faster and more controls can be rendered simultaneously leading to better user experience.

Upon rendering of the first batch, Visibility Watcher™ may remain in viewport or exits viewport. After rendering a batch of controls, Intersection Observer™ of the root panel is restarted. When restarted, Intersection Observer™ issues a callback to notify the panel if a pixel of Visibility Watcher™ intersects with the viewport at 715. If the pixel of Visibility Watcher™ intersects with the viewport, method 700 returns to 710 to (hydrate and render) the next batch of controls. This process continues to be repeated until Visibility Watcher™ is out of view (i.e., a pixel of Visibility Watcher™ no longer intersects with viewport). See step 720.

It should be appreciated that a webpage (or an application) may be composed of several controls, and controls may be of two types—simple controls (e.g., self-contained controls—textbox or radio button) or complex controls (e.g., container control, page container control, stack panel control, etc.) that contain other controls. When a panel is rendering, the panel is only concerned with its children. However, because one of the panel's children may be a complex control, the root panel may not be concerned about the child panel's child. The reason for this, method 700 is applied to every complex control, even the child.

To summarize, each root panel is concerned with rendering and hydration of its immediate children. The hydration and rendering of nested levels are handled by the panel for that level. If there are a large number of controls in the root panel, and when the user scrolls (left/down), Visibility Watcher™ start intersecting with the viewport, and the next batch of control is hydrated and rendered. See step 725. Visibility Watcher™ and Intersection Observer™ remain live until all the controls in the root panel are rendered. When the panel at a sub-level is rendered, the panel does not immediately render its children. Intersection Observer™ follows the same approach as the root panel and only renders depending on the intersection of its own Visibility Watcher™.

Figure 10:
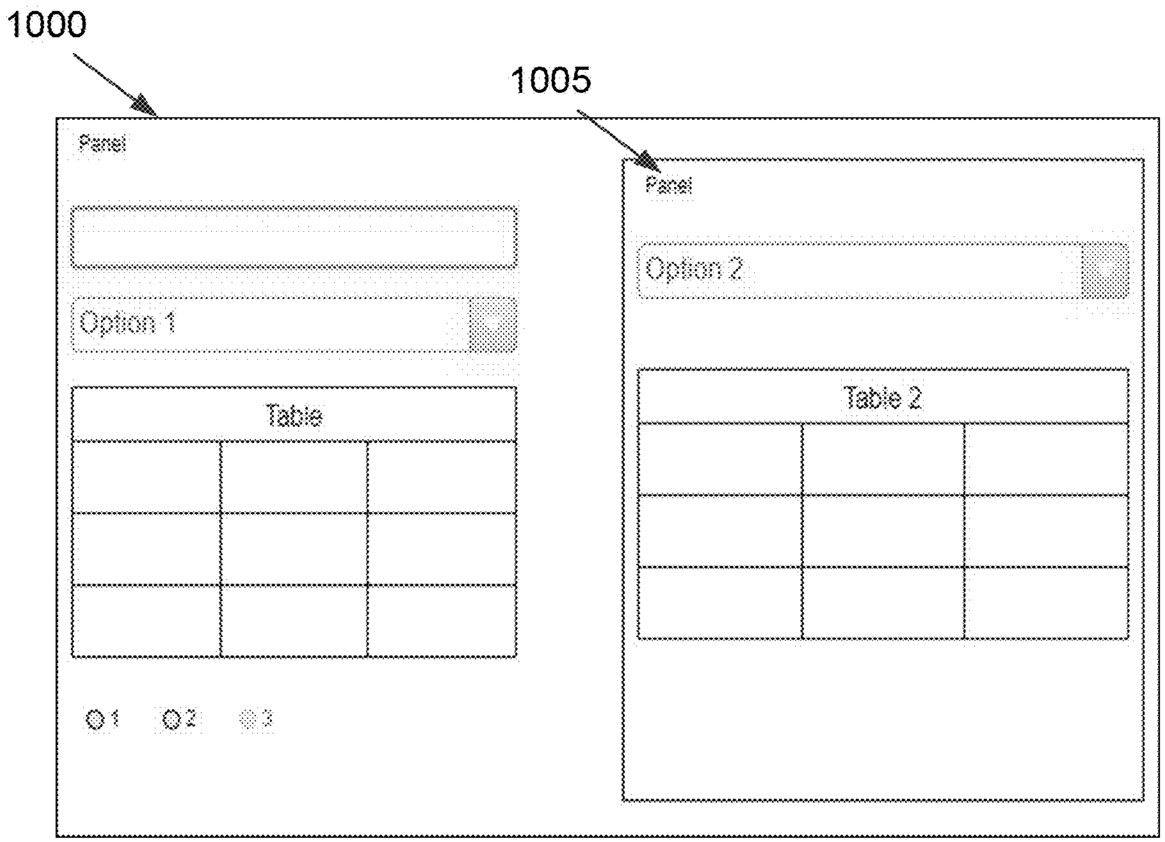
FIG. 10, which is a diagram illustrating a panel with sub-panels (or child panels), according to an embodiment of the present invention.

Each panel (e.g., root panel or control panel) may follow the same algorithm to render its own immediate children. Panel is a container control, which contains N number of controls, that segregates control on a page to layout the controls out differently. See, for example, FIG. 10, which is a diagram illustrating a panel 1000 with sub-panels (or child panels) 1005, according to an embodiment of the present invention.

Returning to FIG. 7, it should be appreciated that method 700 has two breaking conditions. First, if Visibility Watcher™ is out of view with the viewport, forcing method 700 (or algorithm) to stop or enter a suspension state. Second, all the controls have been rendered, forcing method 700 to stop.

In lazy hydration, when the panel determines the batch of control IDs to render, the panel instructs a page model, which in some embodiments loads a panel model, to hydrate the batch of control IDs (or controls). The hydration logic of the controls may be centralized in the webpage model. The panel model instructs the page model to hydrate the panel's controls and return the hydrated controls back to a view layer via the panel model.

It should be appreciated that the hydration process of control happens in two phases, i.e., the creation of a model and property resolution. The creation of a model is synchronous and fast in operation (e.g., less than a millisecond). The rendering is resumed as soon as the control model is created. The control model is then attached to the Angular™ component of the control. While the property resolution is triggered asynchronously and does not block the rendering, once the property resolution is complete, the control aligns itself with property values from the control model. The page model maintains a cache of control models and their corresponding IDs in case a hydration request for the same control is received again. This way, the same control model may be used.

On top of control model creation, property resolution for every control model must occur. There are at least 30 or 40 control properties on each control, so each property needs to be evaluated. A property may be defined as text, font size, alignment, hidden, read only, etc. Every control has a different set of properties that need to be evaluated so the control can be rendered.

Once the control property of each control is resolved and the control model is created, the control model is cached. This way, if a request is received for a control ID, the control model associated with the control ID does not need to be rehydrated.

There are some challenges that need to be overcome to maintain the workflow of lazy rendering and hydration. To do so the concept of forceful hydration and parent-child relationship of control and its panel is introduced.

Random Access to Controls (Forceful Hydration)

Figure 8:
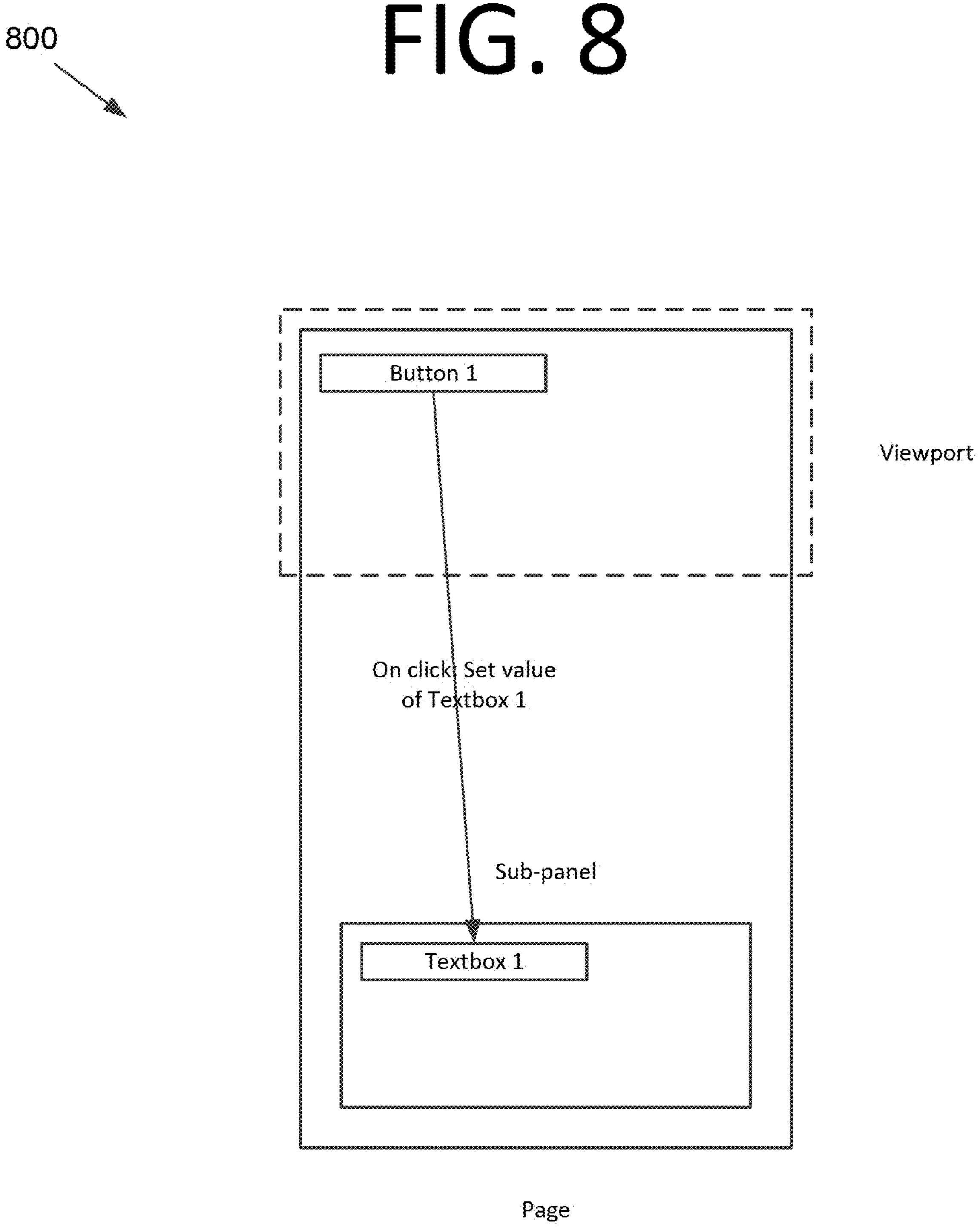
FIG. 8 is a graphical user interface illustrating forceful hydration of a control, according to an embodiment of the present invention.

FIG. 8 is a graphical user interface 800 illustrating forceful hydrating Textbox 1, according to an embodiment of the present invention. In this embodiment, Button 1 is trying to set the value of Textbox 1 and Textbox 1 is present outside of the viewport (i.e., at the bottom of the page). This means Textbox 1 will not be hydrated or rendered. To set the value on Textbox 1, Textbox 1 needs to be forcefully hydrated. Now, when the user scrolls down to Textbox 1, rendering of Textbox 1 occurs. More specifically, looking at FIG. 7, at 710, method 700 may also check into cache to see if control (e.g., Textbox 1) is present. See, for example, FIG. 9, which is discussed in more detail.

When the control (e.g., Textbox 1) is not hydrated, the operation to set the value of the Textbox 1 will fail. To overcome this challenge, the concept of forceful hydration of control is built when demanded.

The binding infrastructure may request the page model to provide the control model by passing the control ID. If the page model has the control model in its cache, then the page model returns the same model; otherwise, the page model creates the control model, hydrates the control model, and then returns the control model to the binding infra. Only that specific control (e.g., Textbox 1) is hydrated, and not its parent, i.e. sub-panel.

Parent-Child Relationship of Control and its Panel

In some embodiments, the control model maintains a relationship with its parent. The control needs to know about its panel model (parent) to work in certain flows. As explained above, a control can be forcefully hydrated at any time without its panel being hydrated. For this reason, there was a need to break this dependency to facilitate the forceful hydration of control. To overcome this, a concept of connected and disconnected controls was built.

In some embodiments, a connected control is a control that is connected if the control has the instance of its panel model available. When control is connected, the control can fulfill all its capabilities.

In some embodiments, a disconnected control is a control that does not have the instance of its panel model available. A disconnected control can only work with limited capabilities.

In some embodiments, a task deferring mechanism may be encoded (or built) in a layer of the control model, where control can defer an operation if it's disconnected. In such an embodiment, those operations are put in a queue to be processed later.

When a panel tries to hydrate and render a control, the page model is responsible for hydrating the control. If the control is already hydrated, the page model connects that control with its panel, as it knows its parent at this point. As soon as the control is connected, the deferred task queue is drained, and all the deferred tasks are performed. In the case of a forceful hydration scenario, the page model hydrates the control model but keeps it disconnected since it is not aware of its parent at that point.

Figure 9:
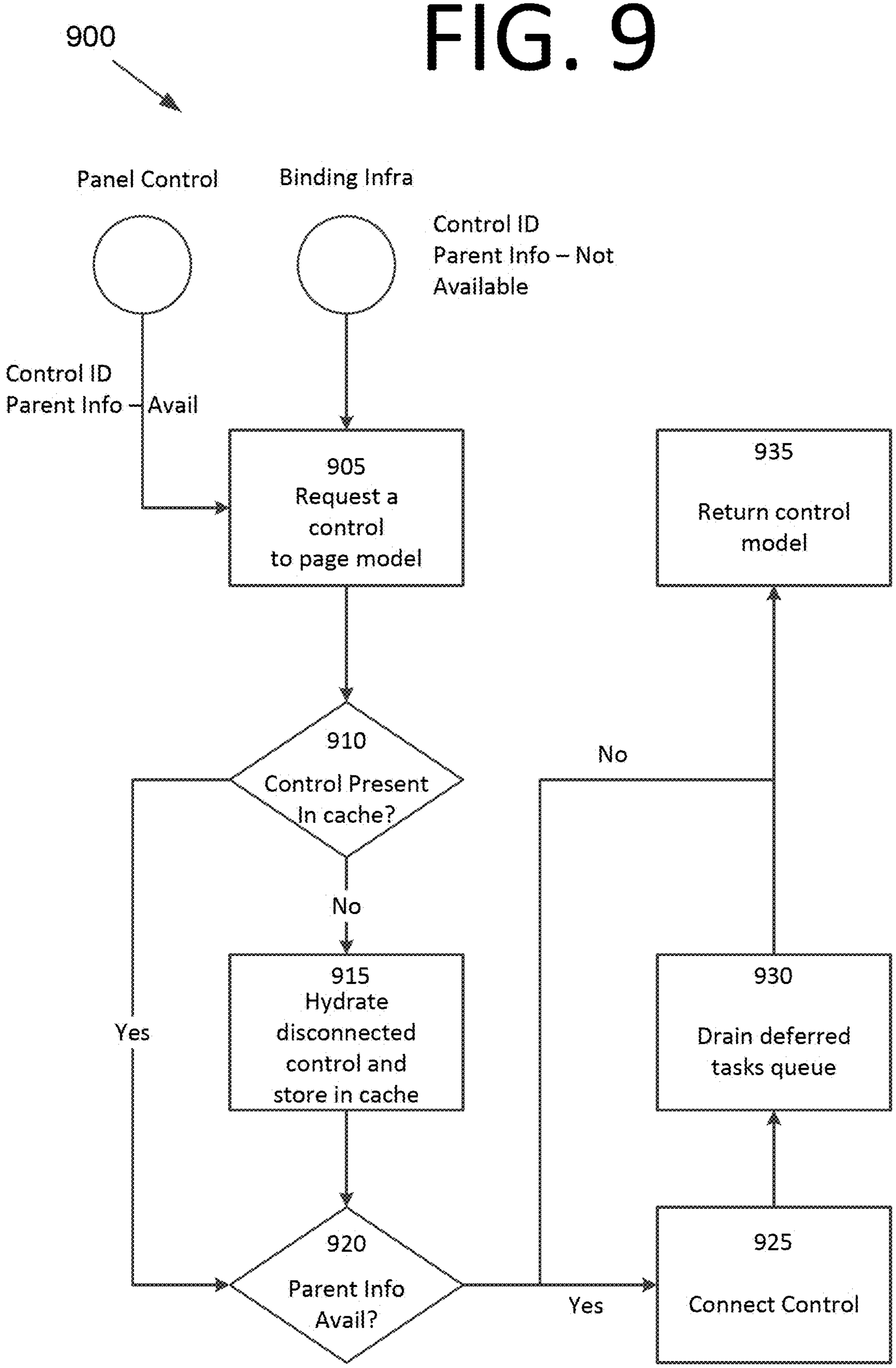
FIG. 9 is a flow diagram illustrating a method for performing control hydration, according to an embodiment of the present invention.

FIG. 9 is a flow diagram illustrating a method 900 for performing control hydration, according to an embodiment of the present invention. A request for a control model may be received in one of two ways. The first way is when the parent wants to render a control, and the second way is when a certain control is referred into a certain binding and that binding is evaluated.

In this embodiment, method 900 may begin with one of two input points-parent control, which includes control ID and parent information that is available, and binding infra, which includes a control ID and parent information is not available.

At 905, method 900 includes requesting a control to page model using parent control input. At 910, page model may check if the control is present in cache. If control is not present in cache, method 900 continues to 915 and hydrates the control and places the hydrated control into disconnected state. In every request, the parent reports to page model that it is the parent of the control ID and is requesting the control. See step 920. If this information is available in the request, then at 925, the hydrated control is placed into a connected state. Otherwise, if the parent information is not available, then, at 935, the control model (e.g., disconnected control) is returned.

Let's assume, parent information is available at 920 and control is set to a connected state at 925, then, at 930, method 900 includes draining deferred task queue, i.e., the control performs all actions that were requested. For example, any validation error is propagated on the control to its parent. This way, the parent knows whether its children are in a OK state or in a error state.

To simplify, whenever a parent control is requesting a control, the control is always connected. This is because the parent is calling; thus, the parent information is always present.

Now, turning to the embodiment where parent information is not available, i.e., binding infra. In this embodiment, a button that is at top of the page is requesting a textbox, which is present at the bottom of the page in some other container. Now that binding infra does not know the parent of the control (textbox). All that binding infra knows is the control ID. In this case, control may or may not be present in the cache of page model. However, the parent information will never be available. Thus, in this flow, the hydrated control model will always be a disconnected model.

In short, there are two scenarios. Let's say that the request for the control came from the binding infra. In this case, the control may be hydrated if it is not present in cache and may be left in a disconnected state since the parent information is not available. Thus, only the control will be returned to the caller. Now any operation performed on this control, which requires parent information, may be placed into a deferred task queue.

Now let's say the next request for this control came from panel control. In this case, the control is present in cache, and will not hydrate. At this point, however, parent information will be available since the parent itself is requesting the control. Method 900 may then connect the control and perform all deferred operations of the control by draining the queue. Finally, method 900 will return the control to the caller (i.e., panel control).

The process steps performed in FIGS. 7 and 9 may be performed by a computer program, encoding instructions for the processor(s) to perform at least part of the process(es)

described in FIGS. 7 and 9, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 7 and 9, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to “certain embodiments,” “some embodiments,” or similar language means that a particular feature, structure, or characteristic described in connection with the embodiment is included in at least one embodiment of the present invention. Thus, appearances of the phrases “in certain embodiments,” “in some embodiment,” “in other embodiments,” or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for performing hydrating and rendering of controls on an application, the computer-implemented method comprising:

initiating, by at least one processor, a visibility watcher element on a viewport of the application;

continuously rendering, by the at least one processor, a plurality of controls on the application when the visibility watcher element intersects with the viewport of the application;

exiting, by the at least one processor, from the visibility watcher element and from the viewport of the application when the visibility watcher element is no longer intersecting with the viewport of the application; and stopping or suspending, by the at least one processor, the continuously rendering of the plurality of controls on the application when the visibility watcher element is no longer intersecting with the viewport of the application.

2. The computer-implemented method of claim 1, further comprising:

determining, by the at least one processor, if one or more controls of the plurality of controls are hydrated.

3. The computer-implemented method of claim 2, wherein the determining the hydrating of the one or more controls of the plurality of controls comprises;

searching, by the at least one processor, in cache for one or more hydrated controls.

4. The computer-implemented method of claim 2, further comprising:

hydrating, by the at least one processor, the plurality of controls when the one or more controls of the plurality of controls is absent from cache.

5. The computer-implemented method of claim 1, further comprising:

connecting, by the at least one processor, the plurality of controls with a corresponding panel.

6. The computer-implemented method of claim 5, wherein the connecting of the plurality of controls comprising:

connecting, by the at least one processor, the plurality of controls when parent information of the plurality of controls is available.

7. The computer-implemented method of claim 5, further comprising:

draining, by the at least one processor, a deferred task queue when one control of the plurality of controls is connected with a corresponding panel, wherein the deferred task queue comprises one or more actions to be performed by the one control of the plurality of controls.

8. The computer-implemented method of claim 1, wherein the continuously rendering comprises:

continuously rendering, by the at least one processor, the plurality of controls on the application when a pixel of the visibility watcher element intersects with the viewport of the application.

9. The computer-implemented method of claim 1, further comprising:

switching, by the at least one processor, a suspended state when the visibility watcher element is no longer intersecting with the viewport of the application.

10. The computer-implemented method of claim 1, further comprising:

forcefully hydrating, by the at least one processor, the plurality of controls when a property associated with a control of the plurality of controls is outside of the viewport of the application.

11. A system configured to perform hydrating and rendering of controls on an application, the system comprising:

a memory storing a set of instructions; and at least one processor, wherein the set of instructions are configured to cause the at least one processor to execute;

initiating a visibility watcher element on a viewport of the application;

continuously rendering a plurality of controls on the application when the visibility watcher element intersects with the viewport of the application;

exiting from the visibility watcher element and from the viewport of the application when the visibility watcher element is no longer intersecting with the viewport of the application; and stopping or suspending the continuously rendering of the plurality of controls on the application when the visibility watcher element is no longer intersecting with the viewport of the application.

12. The system of claim 11, wherein the set of instructions are further configured to cause the at least one processor to execute:

determining if one or more controls of the plurality of controls are hydrated.

13. The system of claim 12, wherein the set of instructions are further configured to cause the at least one processor to execute:

searching in cache for one or more hydrated controls.

14. The system of claim 12, wherein the set of instructions are further configured to cause the at least one processor to execute:

hydrating the plurality of controls when the one or more controls of the plurality of controls is absent from cache.

15. The system of claim 11, wherein the set of instructions are further configured to cause the at least one processor to execute:

connecting the plurality of controls with a corresponding panel.

16. The system of claim 15, wherein the set of instructions are further configured to cause the at least one processor to execute:

connecting the plurality of controls when parent information of the plurality of controls is available.

17. The system of claim 15, wherein the set of instructions are further configured to cause the at least one processor to execute:

draining a deferred task queue when one control of the plurality of controls is connected with a corresponding panel, wherein the deferred task queue comprises one or more actions to be performed by the one control of the plurality of controls.

18. The system of claim 11, wherein the set of instructions are further configured to cause the at least one processor to execute:

continuously rendering the plurality of controls on the application when a pixel of the visibility watcher element intersects with the viewport of the application.

19. The system of claim 11, wherein the set of instructions are further configured to cause the at least one processor to execute:

switching a suspended state when the visibility watcher element is no longer intersecting with the viewport of the application.

20. The system of claim 11, wherein the set of instructions are further configured to cause the at least one processor to execute:

forcefully hydrating the plurality of controls when a property associated with a control of the plurality of controls is outside of the viewport of the application.

* * * * *